United States Patent [19]

Kim et al.

[11] Patent Number: 5,453,836
[45] Date of Patent: Sep. 26, 1995

[54] FIBER OPTIC LASER ROTATION SENSOR UTILIZING A FIBER LOOP REFLECTOR

[75] Inventors: Byoung Yoon Kim, Seoul; Min Yong Jeon; Ho Jin Jeong, both of Daejon, all of Rep. of Korea

[73] Assignee: Agency For Defense Development, Rep. of Korea

[21] Appl. No.: 196,637

[22] Filed: Feb. 15, 1994

[30] Foreign Application Priority Data

Apr. 22, 1993 [KR] Rep. of Korea ............... 6806/1993

[51] Int. Cl.$^6$ ............................... G01C 19/72
[52] U.S. Cl. ............... 356/350; 372/6; 372/94
[58] Field of Search ............... 356/350; 372/94, 372/6

[56] References Cited

U.S. PATENT DOCUMENTS

| | | | |
|---|---|---|---|
| 4,637,025 | 1/1987 | Snitzer et al. | 372/6 |
| 4,671,658 | 6/1987 | Shaw et al. | 356/350 |
| 4,904,041 | 2/1990 | Izadpanah | 372/6 |
| 4,964,131 | 10/1990 | Liu et al. | 372/6 |
| 5,177,562 | 1/1993 | Wysocki et al. | 356/350 |

Primary Examiner—Samuel A. Turner
Attorney, Agent, or Firm—Scully, Scott, Murphy & Presser

[57] ABSTRACT

A mode locked fiber laser gyroscope using a rare-earth doped fiber. The mode locked fiber laser gyroscope comprises a fiber amplifying unit, a dichroic mirror connected to one end of the fiber amplifying unit, and a fiber rotation sensing unit connected to the other end of the fiber amplifying unit in order to generate a signal in accordance with rotation of the laser gyroscope. The rare-earth doped fiber constitutes the fiber amplifying unit and is connected at one end thereof to the dichroic mirror and applied with the light of a pumping light source through the dichroic mirror. The other end of the rare-earth doped fiber is connected to the fiber rotation sensing unit. In the mode locked fiber laser gyroscope of this invention, the measurement of a rotation rate from a detect signal of a photo detector does not require a complex signal processing but is directly achieved by a time axis.

8 Claims, 8 Drawing Sheets

2μs/div

FIBER OPTIC LASER ROTATION SENSOR UTILIZING A FIBER LOOP REFLECTOR

BACKGROUND OF THE INVENTION

1. Field of the Invention

The present invention relates in general to a fiber-optic rotation sensor for measuring a rotation rate, and more particularly to a fiber-optic rotation sensor using a rare-earth doped fiber laser.

2. Description of the Prior Art

Figure 1:
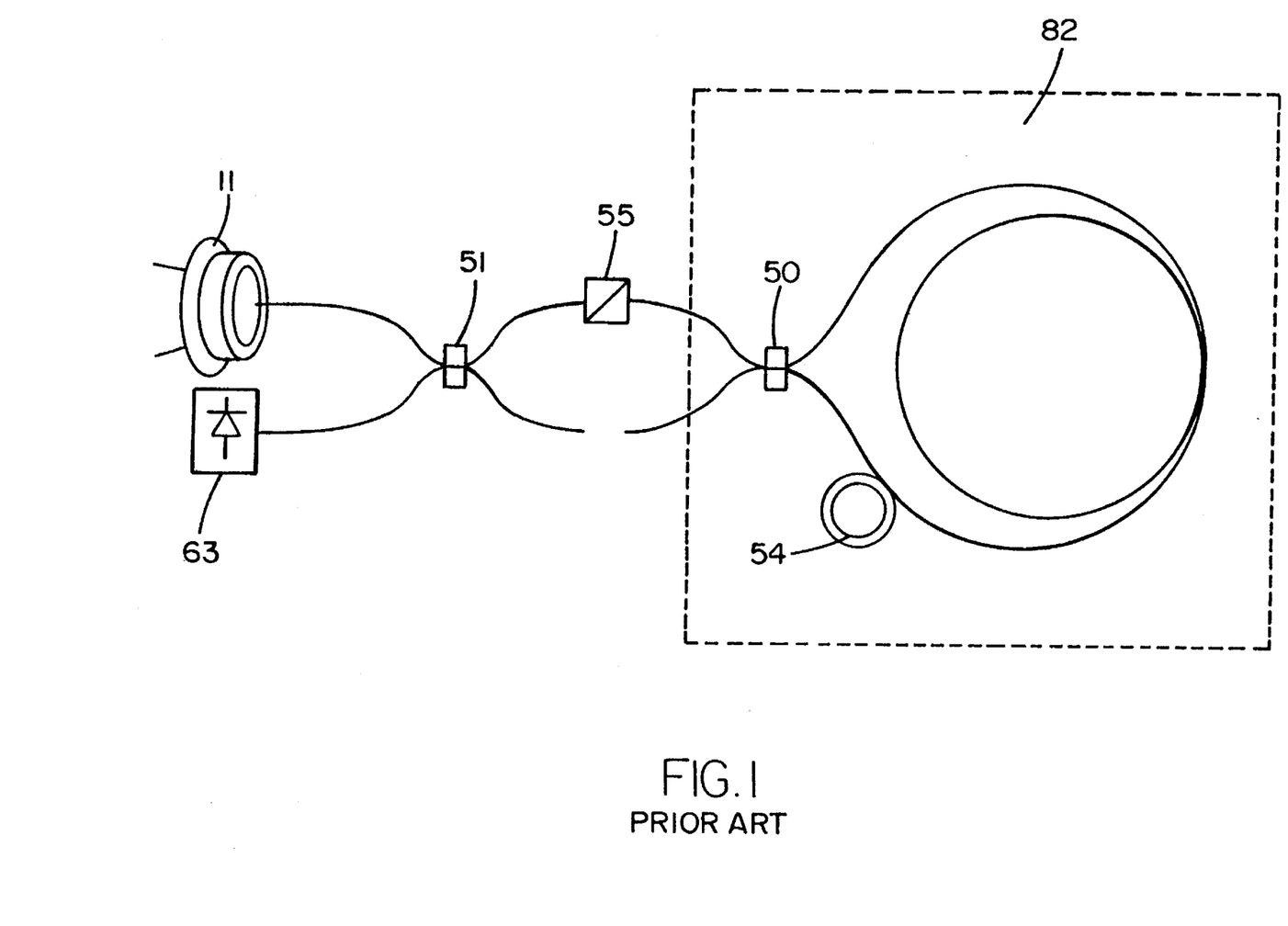
FIG. 1 is a schematic view of a prior art fiber-optic rotation sensor.

With reference to FIG. 1, there is schematically shown a construction of a prior art fiber-optic rotation sensor using an optical fiber. In the prior art fiber-optic rotation sensor, the light emitted from a light source 11 is received by a first directional coupler 51 where the incident light is divided into two parts which are to travel in individual fibers outputted from the directional coupler 51. Here, one of the fibers outputted from the first directional coupler 51 is connected to a polarizer 55 while the other fiber is connected to no element. The polarizer 55 is in turn connected to a second directional coupler 50 which is included in a fiber rotation sensing unit 82. The prior art fiber-optic rotation sensor further includes a phase modulator 54 which is placed in the rotation sensing unit 82 for causing a sensitive measurement of a rotation rate. The first directional coupler 51 is also connected to a photo detector 63 by which an optical signal or an interference signal outputted from the first directional coupler 51 is detected.

In operation of the above prior art fiber-optic rotation sensor, the light emitted from the light source 11 is received by the first directional coupler 51. Upon reception of the light, the first directional coupler 51 divides the incident light into two parts and outputs the two light parts through individual fibers outputted therefrom. One of the light parts outputted from the first directional coupler 51 is in turn received by the second directional coupler 50 of the fiber rotation sensing unit 82 through the polarizer 55 and divided into two light parts therein. In the rotation sensing unit 82, the two light parts from the second directional coupler 50 travel in the fiber coil of the unit 82 in opposed directions and return to the second directional coupler 50. When the two light parts travel in the fiber coil of the unit 82 in opposed directions prior to returning to the second directional coupler 50 as described above, there occurs an interference between the lights. The lights, generating the interference therebetween and returning to the second directional coupler 50, are in turn transmitted to the photo detector 63 through the polarizer 55 and the first directional coupler 51 in series. Upon reception of the lights, the photo detector 63 detects an optical signal or an interference signal from the lights.

At this time, in the case of no rotation of the fiber rotation sensing unit 82, there is reciprocal phase difference between the two lights travelling in the fiber coil of the unit 82 in opposed directions. However, when the fiber rotation sensing unit 82 is rotated, there is a nonreciprocal phase difference between the two lights travelling in the fiber coil of the unit 82 in opposed directions. Such a nonreciprocal phase difference is detected by the photo detector 63, thus to make it possible to measure the rotation rate.

However, it is noted to those skilled in the art that the prior art fiber-optic rotation sensor has a problem in that it should require a substantially complex signal processing in order to measure the rotation rate from the detect signal of the photo detector 63.

SUMMARY OF THE INVENTION

It is, therefore, an object of the present invention to provide a fiber-optic rotation sensor using an optical fiber in which the above problem introduced by the prior art fiber-optic rotation sensor can be overcome and which uses a rare-earth doped fiber, such that the measurement of a rotation rate from a detect signal of an photo detector does not require a complex signal processing but is directly achieved by a time domain axis.

To accomplish the above object, a fiber-optic rotation sensor using a rare-earth doped fiber in accordance with the present invention comprises a fiber amplifying unit, a dichroic mirror connected to one end of the fiber amplifying unit, and a fiber rotation sensing unit connected to the other end of the fiber amplifying unit in order to generate a signal in accordance with rotation of the laser gyroscope.

In a preferred embodiment of this invention, a rare-earth doped fiber constitutes the fiber amplifying unit and is connected at one end thereof to the dichroic mirror and applied with the light emitted from a light source through the mirror, and connected at the other end thereof to the fiber rotation sensing unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
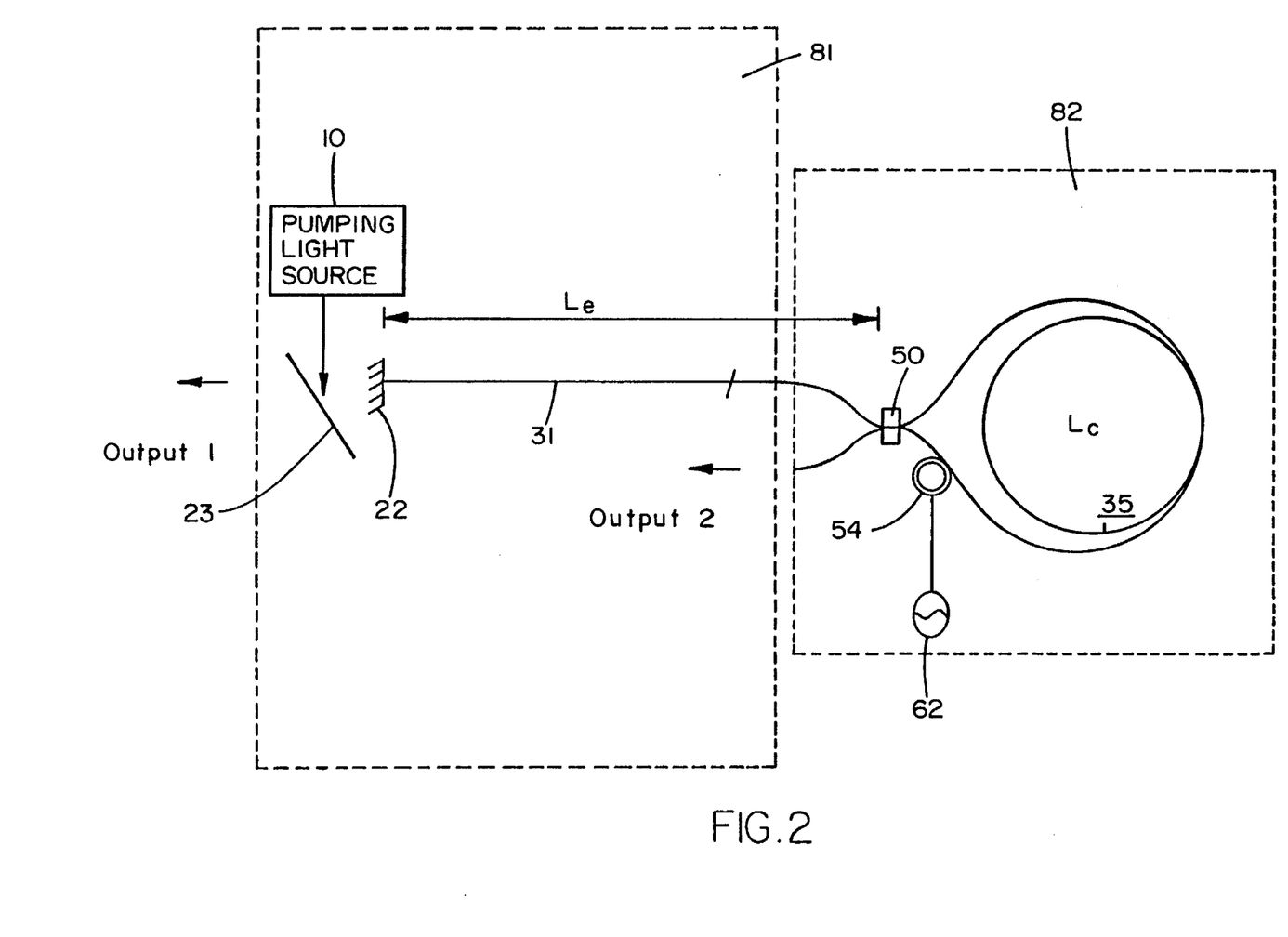
FIG. 2 is a schematic view showing a basic construction of a mode locked fiber laser gyroscope in accordance with the present invention.

With reference to FIG. 2, there is shown in a schematic view a basic construction of a mode locked fiber laser gyroscope in accordance with the present invention. The mode locked fiber laser gyroscope of this invention includes a fiber amplifying unit 81. In the fiber amplifying unit 81, a rare-earth doped fiber 31 is connected at one end thereof to a dichroic mirror 22, thus to cause a light emitted from a pumping light source 10 to be applied to the rare-earth doped fiber 31 through the mirror 22. The other end of the rare-earth doped fiber 31 is connected to a directional coupler 50 of a fiber rotation sensing unit 82, such that the total system of the laser gyroscope serves as a laser resonator. In this drawing, the reference numerals 23 denotes a dichroic beam splitter, the numeral 35 is a fiber coil, the numeral 54 denotes a phase modulator, and the numeral 62 denotes a function generator.

In operation of the above mode locked fiber laser gyroscope, the pumping light of the pumping light source 10 is applied to the rare-earth doped fiber 31 through the dichroic mirror 22. The pumping light applied to the rare-earth doped fiber 31 is absorbed while travelling in the fiber 31, but a light of another wavelength oscillates in the fiber 31. The oscillating light is received by the directional coupler 50 of the fiber rotation sensing unit 82. The oscillating light received by the directional coupler 50 is divided into two light parts which in turn travel in the fiber coil 35 of the unit 82 in opposed directions and return to the directional coupler 50. When the two light parts travel in the fiber coil 35 of the unit 82 in opposed directions prior to returning to the directional coupler 50 as described above, there occurs an interference between the lights. In this case, when the phase modulator 54 of the rotation sensing unit 82 is applied with a modulation signal by a sinusoidal signal of the function generator 62 in accordance with a frequency corresponding to a longitudinal mode spacing of the laser resonator, the length of the fiber rotation sensing unit 82 is modulated and a mode locking is achieved.

In addition, when the fiber rotation sensing unit 82 is rested, the mode-locked pulse becomes two pulses for a modulating pulse, and the two pulses are spaced out at equal space. However, when the fiber rotation sensing unit 82 is rotated, the pulses having been spaced out at regular intervals are shifted in their positions, thus to maintain the regular intervals no longer. The desired measurement of the rotation rate is achieved by measuring such a positional shift of the pulses. The basic theory for the measurement of the rotation rate is as follows.

The simplified schematic of the mode locked fiber laser gyroscope (MLFLG) is shown in FIG. 2. It consists of a laser cavity formed by a planar mirror at one end and a Sangnac interferometer at the other end with an optical amplifier in between. In the present invention, when the optical gain provided by the amplifier is greater than the round trip loss, the system operates as a cw laser since the Sangnac interferometer acts as a loop-reflector. Here, the reflection coefficient of the loop-reflector is a function of the rotation rate or any non-reciprocal phase shift introduced between the counter-propagating waves in the Sagnac interferometer. A fiber-optic phase modulator 54 is located near one end of the fiber coil 35, as shown in the FIG. 2, can be used to modulate the optical loss in the cavity by modulating the phase difference between the counter-propagating waves. When the frequency of the loss modulation is the same as the frequency spacing of the longitudinal modes of the laser (i.e. $\Delta f = c/n(L_c + 2L_e)$, where n is the refractive index.), mode locking takes place and the output of the laser becomes a series of short pulses. The timing of the pulses is determined such that the oscillating pulses in the cavity passes through the loss modulator at the time of minimum loss. The depth of optical loss modulation for the system in FIG. 2 becomes maximum when the modulation frequency is $f_m = c/2L_c n$. At this frequency, the modulation provided by the loop-reflector is pure amplitude modulation without any phase modulation simplifying the mode locking process. In order to operate at $f_m = \Delta f$, the optical length of the fiber cavity outside of the sensing loop should be half that the sensing loop($L_e = L_c/2$).

Figure 3:
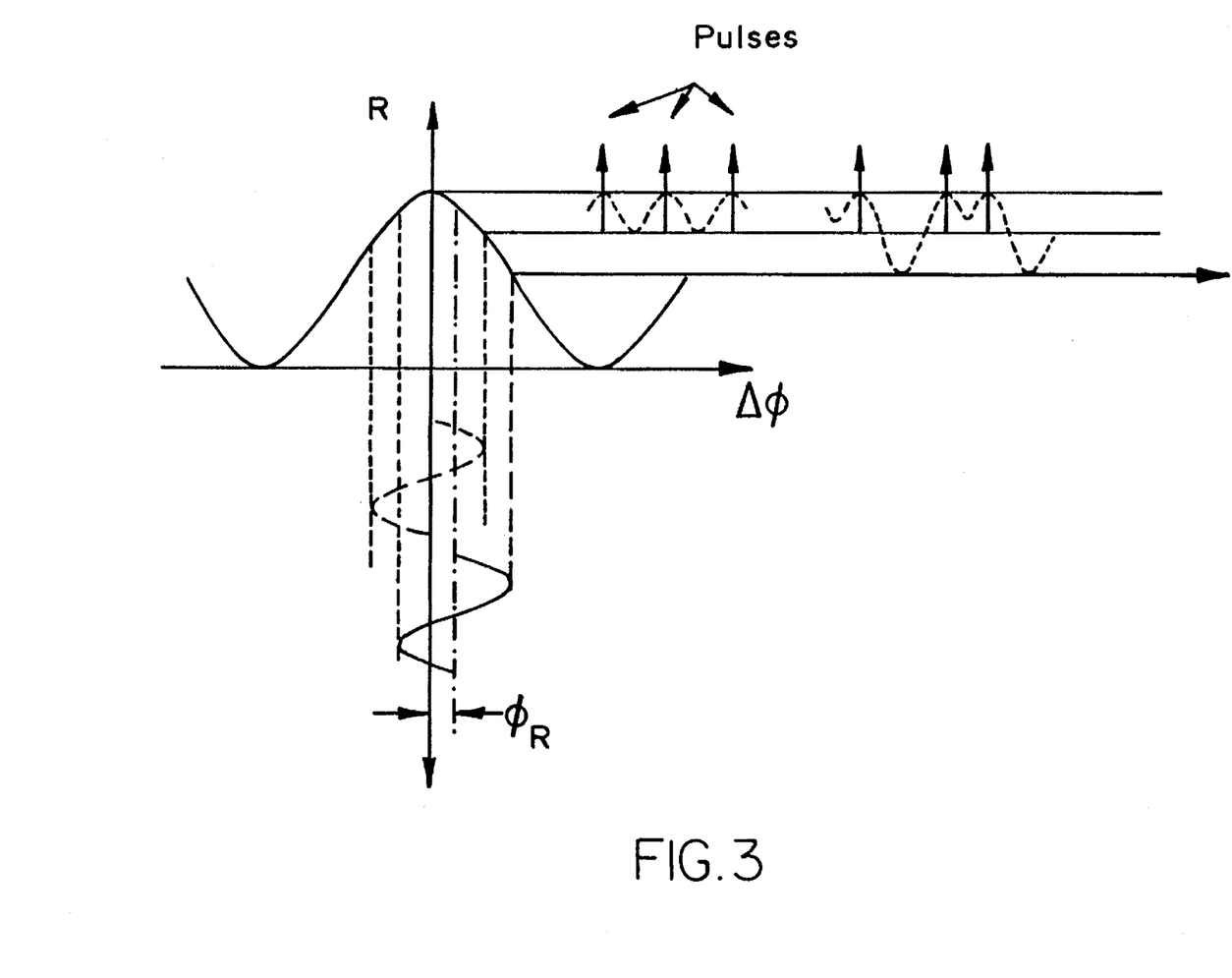
FIG. 3 is a pulse diagram representing a theory of signal detection of the present invention.

FIG. 3 shows the reflectivity of the Sagnac interferometer(R) with respect to the phase difference($\Delta\phi$) demonstrating the timing of the optical pulses in the presence of a sinusoidal phase difference modulation. Optical pulses will be produced at the time when the net phase difference between the counter-propagating waves in the sensing loop is zero where the reflectivity from the Sagnac interferometer is unity. Therefore, for every cycle of the phase difference modulation, two optical pulses are produced if the rotation induced non-reciprocal phase shift($\Delta\phi_R$) is less than the amplitude of the phase difference modulation($\phi_m$). Without any rotation input, the optical pulses are equally spaced. With rotation input, however, the two sets of optical pulses will be shifted in time by the same amount but with opposite directions. The amount of timing shift represents the rotation rate with the relationship, $$\Delta t = T/2\pi \sin^{-1}(\Delta\phi_R/\phi_m) \tag{1}$$

where $T = 1/f_m$. If the sense of the rotation is reversed, so does the direction of the timing shift that can be measured with reference to the electrical signal applied to the phase modulator. By measuring the time separation of the optical pulses, the rotation rate can easily be obtained. More than two optical pulses per phase modulation cycle can be produced depending on the amplitude of the phase difference modulation and the rotation induced phase shift. Note that enough phase modulation amplitude should be provided to cover desired dynamic range of the gyroscope. Another possibility is to use a triangular phase difference modulation waveform that produces a linear scale factor instead of equation (1). If the splitting ratio of the directional coupler is exactly 50%, no light output is expected from output 2. Light signal from output 1 with less than 100% mirror could be used as the output of the gyro.

Figure 4:
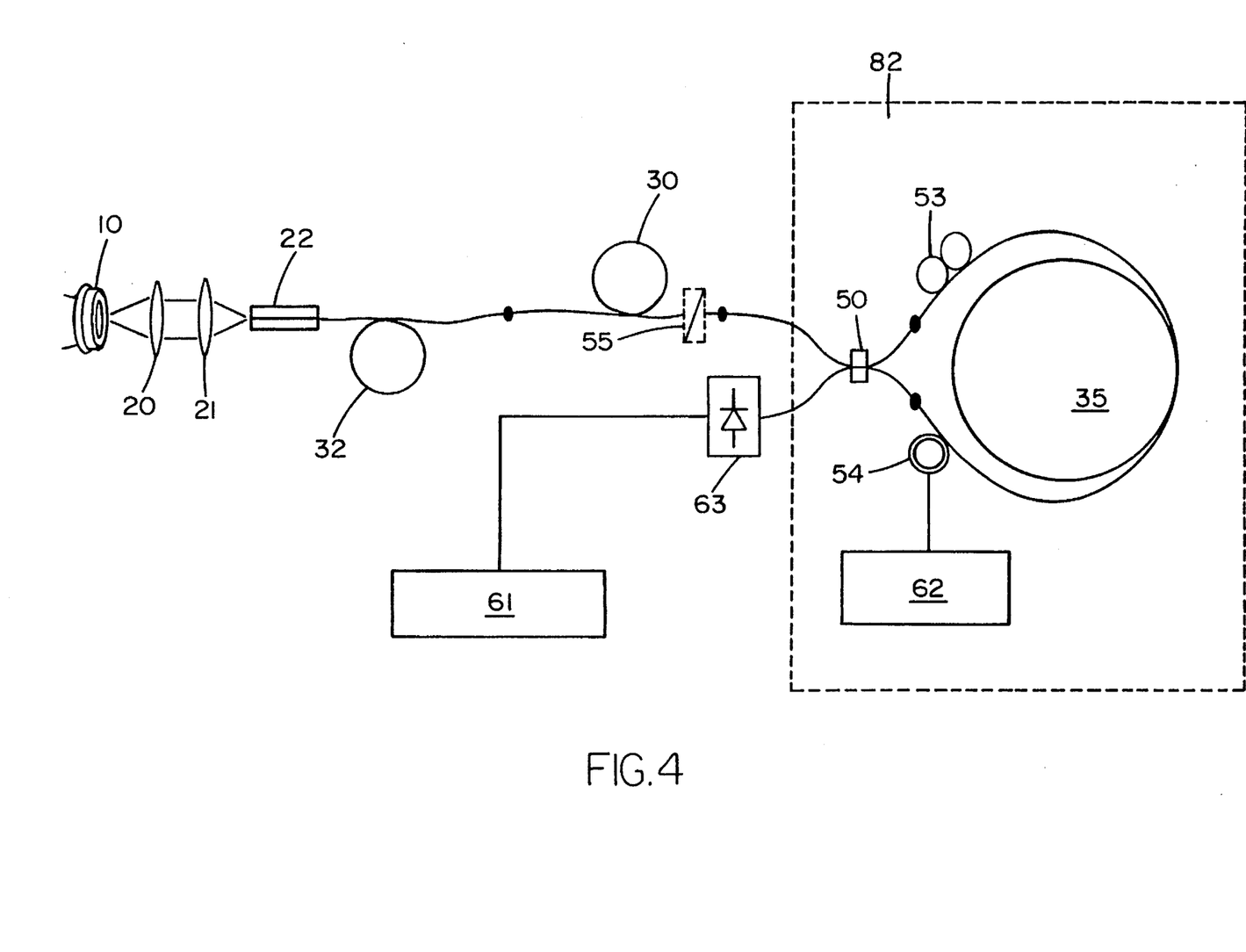
FIG. 4 is a schematic view showing a construction of an experimental mode locked fiber laser gyroscope of the present invention.

Turning to FIG. 4, there is shown a construction of an experimental mode locked fiber laser gyroscope of the present invention. In this experimental mode locked fiber laser gyroscope, a Nd-doped fiber 32, which is doped with neodymium (Nd), is used as the rare-earth doped fiber 31. The Nd-doped fiber 32 is connected at one end thereof to a dichroic mirror 22 which has a selective transmissibility in that it reflects at least 99% of an incident light under the condition of 1.06 µm but transmits at least 80% of the incident light under the condition of 0.8 µm. The other end of the Nd-doped fiber 32 is connected to the directional coupler 50 of the fiber rotation sensing unit 82. A laser diode of 500 mW power and 808.4 nm wavelength is used as the pumping light source 10. The experimental mode locked fiber laser gyroscope further includes a pair of objective lenses 20 and 21 of twenty magnifications which are disposed between the pumping light source 10 and the mirror 22, so that the pumping light of the light source 10 is applied to the mirror 22 through the objective lenses 20 and 21.

In order to prepare the fiber coil 35 which serves as rotation sensing means of the fiber rotation sensing unit 82, 600 m of single mode optical fiber having 790 nm cut-off wavelength is symmetrically wound around a cylindrical spool having 8 cm radius. An extra length of fiber 30 of 182 m was spliced between the Nd-doped fiber 32 and the directional coupler 50 to increase the amplitude modulation. Although it was not long enough to satisfy the condition described above($L_e=1/2L_c$), it was sufficient for demonstrating the operating principle of the gyroscope. The phase modulator 54 is provided at one end of the loop of the fiber coil 35 while a polarization controller 53 is provided inside the loop of the fiber coil 35 in order to provide reciprocity for the interfering optical waves. The frequency which is equal to the longitudinal mode space of the laser cavity 195.4 KHz. The phase modulator 54 is applied with a modulation signal by a function signal of the function generator 62 according to the above frequency, thus to obtain a short optical pulse output which is mode-locked. That is, the optical signal outputted from the directional coupler 50 is detected by the photo detector 63, and the detect signal of this photo detector 63 is measured by the oscilloscope 61.

In this drawing, the reference numeral 30 denotes a general type optical fiber.

Figure 5A:
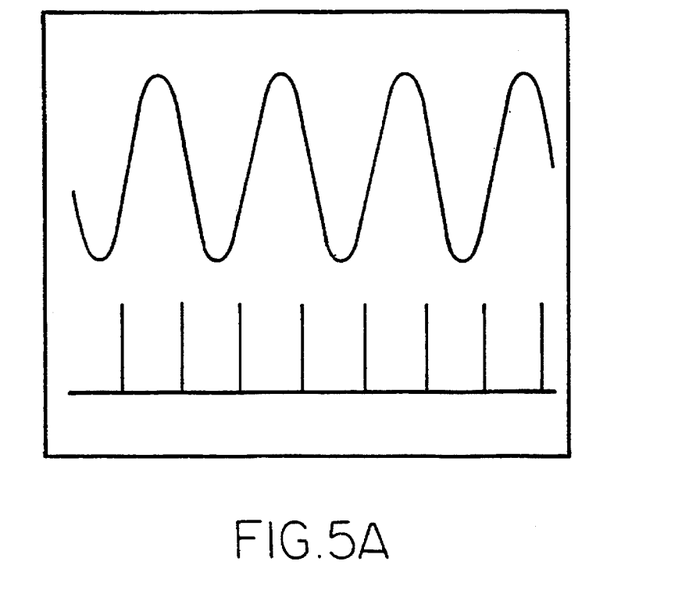
FIGS. 5A and 5B are wave form diagrams of signals detected by an oscilloscope when the mode locked fiber laser gyroscope of the present invention is rested and rotated, respectively.
Figure 5B:
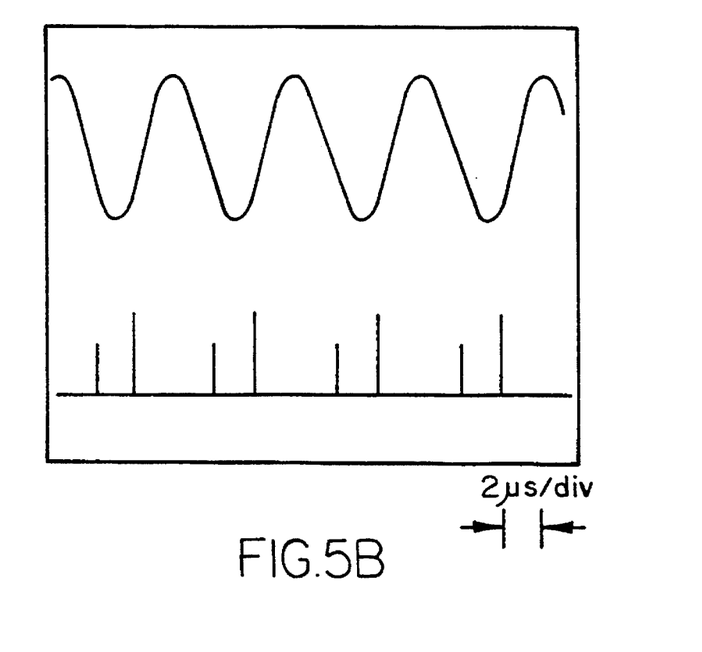

FIGS. 5A and 5B are wave form diagrams of signals detected by the oscilloscope 61 when the mode locked fiber laser gyroscope of the present invention is rested and rotated, respectively. The pulse width is 50 ns and the pulse appears at a position of the maximum reflectance as described above. From FIG. 5A, it is noted that the generated pulses are spaced out at regular intervals when the fiber rotation sensing unit 82 is stopped. From FIG. 5B, it is noted that two sets of pulses are shifted by the same value in opposed directions when the fiber rotation sensing unit 82 is rotated at a rotational speed of 15°/s.

Figure 6:
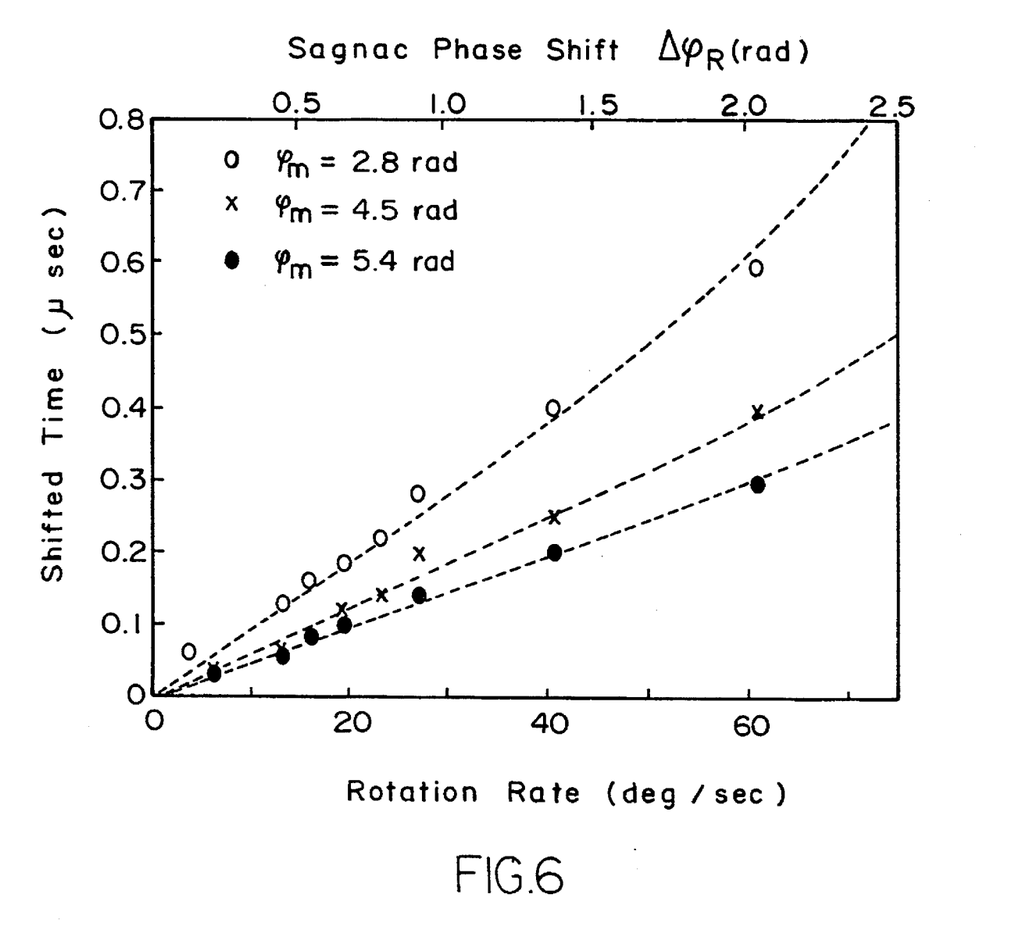
FIG. 6 is a graph representing a relation between a rotation rate, measured while varying both modulation depth for a phase modulator and the rotation rate of the mode locked fiber laser gyroscope, and a shifted time value.

FIG. 6 shows the shift of the timing of the pulse Δt as a function of rotation rate for three different values of phase modulation amplitudes.($\phi_m$=2.8, 4.5 and 5.4 rad) The dotted curves correspond to theoretical curves obtained with Eq (1) and agree well with experimental results. In addition, in the present invention, the measurement of the rotation rate of the gyroscope does not require a complex signal processing but is directly achieved from the time axis.

Generally, it is noted to those skilled in the art that use of a general type optical fiber in preparation of a gyroscope results in detection of various unnecessary signals due to a random birefringence of the optical fiber. In order to remove the various unnecessary signals caused by the random birefringence of the optical fiber, the mode locked fiber laser gyroscope of the present invention uses a polarizer.

Figure 7:
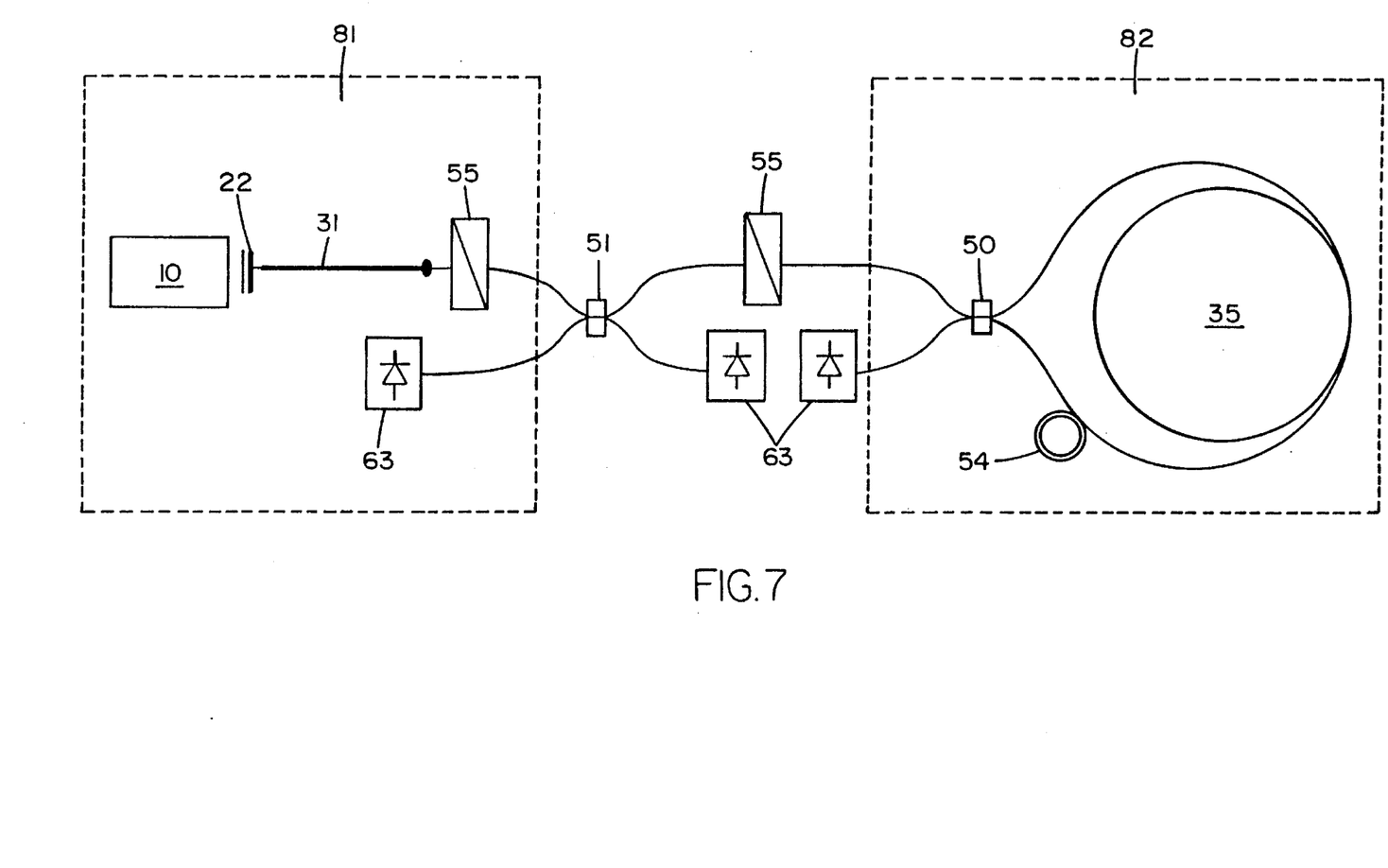
FIG. 7 is a schematic view showing a construction of a mode locked fiber laser gyroscope having a polarizer placed on an optical fiber between a fiber amplifying unit and a fiber rotation sensing unit in accordance with an embodiment of the present invention.

With reference to FIG. 7, there is shown a mode locked fiber laser gyroscope provided with a polarizer in accordance with an embodiment of the present invention. In this second alternate embodiment, a pair of polarizers 55 and an additional directional coupler 51 are placed on a general type optical fiber which connects the other end of the rare-earth doped fiber 31 to the directional coupler 50 of the fiber rotation sensing unit 82. The polarizers 55 provided for the mode locked fiber laser gyroscope using the general type optical fiber remove the various unnecessary signals generated by the random birefringence of the optical fiber. Please note that all of the various unnecessary signals are efficiently removed when signals are experimentally measured by the oscilloscope 61 of the experimental mode locked fiber laser gyroscope of FIG. 4 under the condition that the polarizer 55 is placed on the general type optical fiber 30 between the rare-earth doped fiber 31 and the directional coupler 50 of the fiber rotation sensing unit 82.

Figure 8:
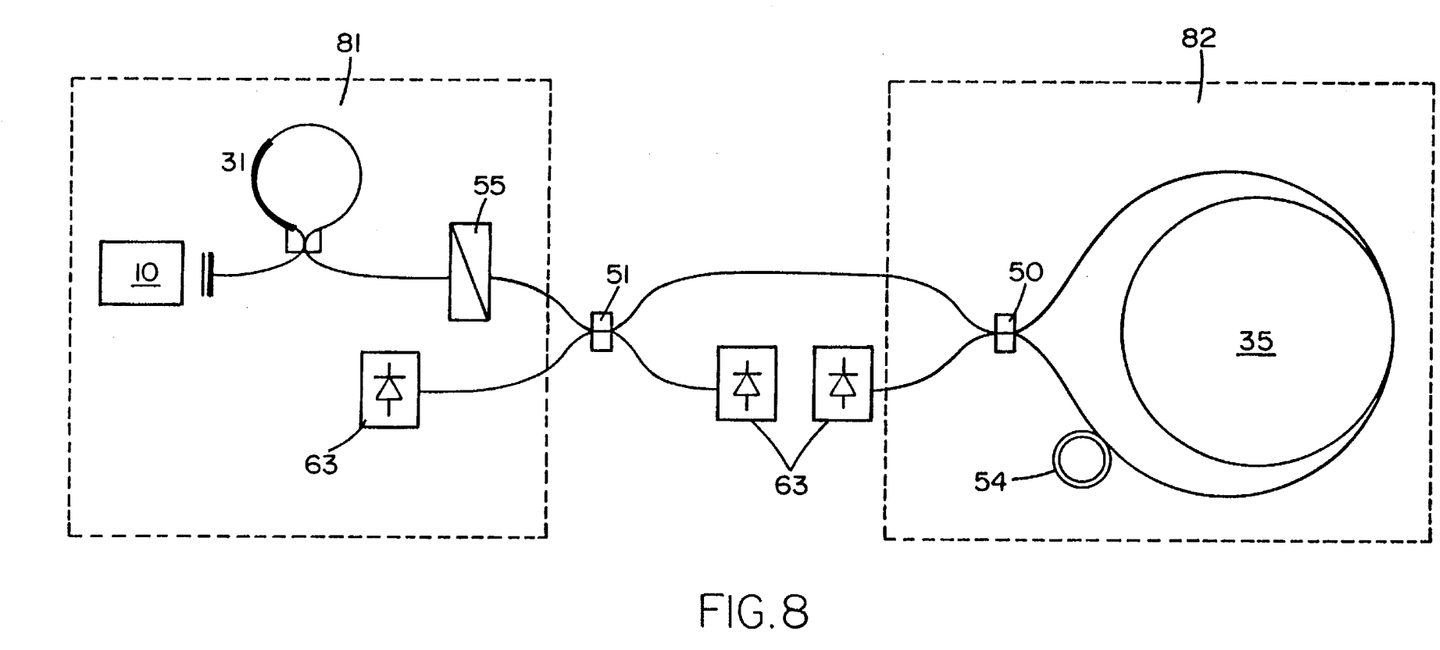
FIG. 8 is a schematic view showing a construction of a mode locked fiber laser gyroscope having a fiber amplifying unit comprising a rare-earth doped fiber loop in accordance with another embodiment of the present invention.

Turning to FIG. 8, there is shown a mode locked fiber laser gyroscope having a fiber amplifier comprising a fiber loop in accordance with another embodiment of the present invention. In this embodiment, the rare-earth doped fiber 31 is not connected at one end thereof to the dichroic mirror 22 but includes the fiber loop, thus to cause the pumping light emitted from the pumping light source 10 to be directly applied to the rare-earth doped fiber 31. The other end of the rare-earth doped fiber 31 is connected to the directional coupler 50 of the fiber rotation sensing unit 82 through a polarizer 55 and an additional directional coupler 51. When the rare-earth doped fiber 31 includes the fiber loop as described above, the pumping light of the pumping light source 10 is directly applied to the rare-earth doped fiber 31 and absorbed while travelling in the fiber 31, but a light of another wavelength oscillates in the fiber 31. The oscillating light is, thereafter, received by the directional coupler 50 of the fiber rotation sensing unit 82 through the polarizer 55 and the additional directional coupler 51, and travel in the fiber prior to detection of signal by the photo detector 63 in the same manner as described above.

In the present invention, the rare-earth doped fiber 31 may be doped with an erbium (Er) instead of the neodymium (Nd). In the laser gyroscope using the Er-doped fiber instead of the Nd-doped fiber, the oscillation wavelength is 1.55 mm differently from the laser gyroscope using the Nd-doped fiber, but the general construction of the gyroscope remains the same as described for the above embodiments using the Nd-doped fiber 31 and further explanation is thus not deemed necessary.

On the other hand, the position of the photo detector 63 may be a second output, that is, an output 2, as shown in FIG. 2 or individual outputs of the directional couplers 50 and 51 as shown in FIGS. 7 and 8 without affecting the functioning of this invention.

As described above, a mode locked fiber laser gyroscope using an optical fiber of the present invention uses a rare-earth doped fiber such that the measurement of a rotation rate from a detect signal of a photo detector does not require a complex signal processing but is directly achieved by a time axis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber optic laser rotation sensor utilizing a fiber loop reflector comprising:

a. an optical active medium having a first end and an opposite second end;

b. a dichroic mirror connected to the first end of said optical active medium; and c. a fiber loop reflector connected to the second end of said optical active medium to form a laser resonator.

2. A fiber optic laser rotation sensor according to claim 1, wherein said optical active medium includes a single-mode optical fiber doped with a lasing material.

3. A fiber optic laser rotation sensor according to claim 2, wherein said lasing material is Erbium.

4. A fiber optic laser rotation sensor according to claim 2, wherein said lasing material is Neodymium.

5. A fiber optic laser rotation sensor according to claim 1, wherein said optical active medium includes a semiconductor optical amplifier.

6. A fiber optic laser rotation sensor according to claim 1, including a pumping light source, and wherein said optical active medium is pumped by light from the pumping light source passing through said dichroic mirror.

7. A fiber optic laser rotation sensor according to claim 1, wherein said optical active medium is a rare-earth doped fiber.

8. A fiber optic laser rotation sensor according to claim 7, including a pumping light source, and wherein said rare-earth doped fiber comprises a fiber loop to cause light from the pumping light source to be directly applied to said rare-earth doped fiber.

* * * * *